United States Patent
Bock et al.

(10) Patent No.: US 9,688,346 B2
(45) Date of Patent: Jun. 27, 2017

(54) VARIABLE HEIGHT INFINITELY ADJUSTABLE FORK ADAPTABLE TO VARIOUS WHEEL SIZES

(71) Applicant: Freedom Concepts Inc., Winnipeg (CA)

(72) Inventors: Colin Bock, Winnipeg (CA); Duy Tran, Winnipeg (CA)

(73) Assignee: FREEDOM CONCEPTS INC., Winnipeg, Manitoba (CA)

( * ) Notice: Subject to any disclaimer, the term of this patent is extended or adjusted under 35 U.S.C. 154(b) by 0 days.

(21) Appl. No.: 14/861,181

(22) Filed: Sep. 22, 2015

(65) Prior Publication Data
US 2016/0229482 A1    Aug. 11, 2016

Related U.S. Application Data

(60) Provisional application No. 62/053,354, filed on Sep. 22, 2014.

(51) Int. Cl.
*B62K 25/08* (2006.01)
*B62K 25/06* (2006.01)

(52) U.S. Cl.
CPC .............. *B62K 25/08* (2013.01); *B62K 25/06* (2013.01)

(58) Field of Classification Search
CPC ................................. B62K 25/08; B62K 25/06
USPC ........................................................ 280/276
See application file for complete search history.

(56) References Cited

U.S. PATENT DOCUMENTS

| | | | | |
|---|---|---|---|---|
| 4,735,276 A * | 4/1988 | Burton | ................... | B62K 25/08 180/219 |
| 6,592,136 B2 * | 7/2003 | Becker | ................... | B62K 25/08 188/282.1 |
| 6,688,626 B2 * | 2/2004 | Felsl | ..................... | B62K 25/04 267/124 |
| 7,017,928 B2 * | 3/2006 | Felsl | ..................... | B62K 25/04 267/124 |
| 7,163,222 B2 * | 1/2007 | Becker | ................... | B62K 25/08 280/276 |
| 7,347,438 B2 * | 3/2008 | Raddin | ................... | B62K 21/02 280/274 |
| 7,690,666 B2 * | 4/2010 | McAndrews | .......... | B62K 25/04 188/275 |
| 8,196,947 B2 * | 6/2012 | Achenbach | ............ | B62K 25/08 280/276 |
| 8,480,064 B2 * | 7/2013 | Talavasek | ............... | B62K 25/20 267/217 |
| 8,489,277 B2 * | 7/2013 | Hara | ..................... | B62K 25/04 280/283 |

(Continued)

*Primary Examiner* — Joseph Rocca
*Assistant Examiner* — Michael Stabley
(74) *Attorney, Agent, or Firm* — Kyle R. Satterthwaite; Ryan W. Dupuis; Ade & Company Inc.

(57) ABSTRACT

A variable height, infinitely adjustable front fork system that can adapt to various wheel sizes. On traditional front bicycle fork system, to change the tire size require a change in the fork, and to change the height of the fork relative to the frame that hold the front fork would require again a change to the fork. This new fork system addresses these two concerns. With a push of a button, or simple manipulation of a handle, the height of the fork relative to the frame can be made via a telescopic fork blade design. To accommodate different tire sizes, a user simply re-positions a pair of clamp-on wheel dropouts along a lower half of the telescopic blades.

16 Claims, 11 Drawing Sheets

(56) References Cited

U.S. PATENT DOCUMENTS

| | | | |
|---|---|---|---|
| 2001/0030408 A1* | 10/2001 | Miyoshi | B62K 25/04 280/276 |
| 2003/0020255 A1* | 1/2003 | Felsl | B62K 25/04 280/283 |
| 2008/0296814 A1* | 12/2008 | Franklin | B62K 25/04 267/64.25 |
| 2014/0300077 A1* | 10/2014 | Coghill, Jr. | B62K 3/10 280/259 |

* cited by examiner

VARIABLE HEIGHT INFINITELY ADJUSTABLE FORK ADAPTABLE TO VARIOUS WHEEL SIZES

CROSS REFERENCE TO RELATED APPLICATIONS

This application claims benefit under 35 U.S.C. 119(e) of Provisional Application Ser. No. 62/053,354, filed Sep. 22, 2014.

FIELD OF THE INVENTION

The present invention relates generally to bicycles and tricycles, and more particularly to a front fork assembly that is configurable to accommodate different wheel sizes while also providing variable height adjustability to said fork.

BACKGROUND OF THE INVENTION

It is well known in the prior art to provide either a rigid fork or a suspension fork to house the front tire of a two wheel bicycle or three wheel tricycle. These prior art fork devices can be classified into a number of different types.

A first type is a rigid fork giving the bicycle a rigid platform to mount the front tire. The effect of this rigid platform means that the bicycle has a uniform front to rear geometry in all riding conditions.

Another type is a suspension fork giving the bicycle still a uniform front to rear geometry. The effect of the suspension fork comes in to play over rough terrain experienced between the front and rear tires. The front suspension fork assembly helps absorb the rough terrain with the aid of springs located inside telescopically mated tubes of the fork.

The second type can be further classified according to whether the fork can be adjusted to vary the amount of absorption the suspension can provided, which is some cases may be reduced to zero, thereby effectively making the adjustable suspension fork a rigid suspension-less fork of the first type. The variable shock absorption does not change the normal default front to rear geometry of the bike.

Applicant has developed a new and unique variable height infinitely adjustable fork adaptable to various wheel sizes, with advantageous features not disclosed or suggested by the rigid and suspension forks of the prior art.

SUMMARY OF THE INVENTION

According to a first aspect of the invention, there is provided an adjustable front fork system for a bicycle, tricycle or the like, the adjustable front fork system comprising:

a steerer tube for coupling to handlebars of the bicycle, tricycle or the like;

first and second telescopic blade assemblies residing on opposite sides of the steerer tube, each telescopic blade assembly comprising:

an outer blade unit having a hollow interior; and an inner blade unit telescopically mated with the outer blade unit for displacement of the inner blade member back and forth within the hollow interior the outer blade unit to retract and extend the inner blade unit relative to the outer blade unit through an open end thereof;

a connection of either the outer blade unit or the inner blade unit to the steerer tube at or adjacent an upper end of the blade assembly; and a wheel connector attached to the other one of either the outer blade unit or inner blade unit at a distance spaced downwardly from the connection toward a lower end of the blade assembly to support a respective end of a wheel axle of the bicycle, tricycle or the like that is to be carried between the blade assemblies;

whereby telescopic displacement of the inner blade members back and forth within the outer blade units changes a height of the adjustable fork measured between a top end of the steerer tube and the lower ends of the telescopic blade assemblies.

Preferably least one of the blade assemblies comprises a locking or limiting device operable to prevent or limit movement between the outer blade unit and inner blade unit in order to lock or limit adjustment of the height of the fork.

In one embodiment, the inner and outer blade units of the first telescopic blade assembly comprise opposing ones of either a piston rod or cylinder of a lockable gas spring assembly, a locking mechanism of which defines the locking device of the adjustable fork.

Preferably an actuator of the locking mechanism of the lockable gas spring is disposed at a top end of the lockable gas spring that resides at or adjacent the top end of the first blade assembly.

Preferably the inner blade unit of the first telescopic blade assembly is connected to the steerer tube and comprises the piston rod of the lockable gas spring assembly, and the locking mechanism comprises a release pin, a head of which protrudes upward from a top end of the piston rod to define a lock-release actuator at or adjacent the top end of the first telescopic blade assembly.

Preferably the first telescopic blade assembly further comprises a pair of telescopically mated tubes, each attached to a respective one of either the piston rod or the cylinder in a position closing circumferentially therearound.

Preferably the outer blade unit of the first telescopic blade assembly further comprises an outer blade tube in which the cylinder of the lockable gas spring is received and to which the cylinder of the lockable gas spring is attached.

Preferably the inner blade unit of the first telescopic blade assembly further comprises an inner blade tube that closes around the lockable gas spring, is attached to the piston rod thereof and is telescopically received in the outer blade tube.

Preferably the lockable gas spring, when locked, is rigidly locked in an extension direction.

Preferably the lockable gas spring, when locked, is rigidly locked in only the extension direction.

Preferably there is provided a brake mount arrangement carried on the steerer tube and arranged to support a rim brake of the bicycle, tricycle or the like, wherein the wheel connectors and the steerer tube are adjustable in position relative to one another along the height of the adjustable fork independently of the telescopic displacement between the inner and outer blade units of each blade assembly.

Preferably the brake mount arrangement is carried by the telescopic blade assemblies in a manner movable relative to the steerer tube via the telescopic displacement between the inner and outer blade units of each blade assembly, and the wheel connectors are selectively repositionable to any of a plurality of different positions along the blade assemblies.

Preferably the inner blade unit of each telescopic blade assembly is connected to the steerer tube and the wheel connector of each telescopic blade assembly is selectively repositionable to any of a plurality of different positions along the outer blade unit.

Preferably the wheel connectors each comprise a releasable and tightenable clamping mechanism operable to circumferentially clamp the wheel connectors to the blade assemblies.

Instead of using a gas spring, the first telescopic blade assembly may comprise a screw actuator operable to effect the telescopic displacement between the inner and outer blade units.

In one screw-actuated embodiment, the inner and outer blade units of one of the telescopic blade assemblies comprise opposing ones of an internally threaded outer member and an externally threaded inner member, one of which is coupled to the steerer tube and one of which is rotatable about an axis thereof relative to the other, wherein the threaded members are threaded together for telescopic extension and collapse of the telescopic blade assembly through relative rotation of said threaded members.

In one screw-actuated embodiment, the inner blade unit of one of the telescopic blade assemblies comprises an externally threaded shaft supported for rotation about a longitudinal axis of said threaded shaft and connected to the steerer tube, and the outer blade unit of said one of the telescopic blades is an internally threaded member in which the threaded shaft is threadingly mated and on which the respective wheel carrier is externally mounted, whereby rotation of the threaded shaft in opposing directions operates to extend and collapse said one of the telescopic blade assemblies. Preferably the threaded telescopic blade assembly comprises a handle coupled to the externally threaded shaft at an upper end thereof for manual rotation of the handle to extend and collapse said telescopic blade assembly.

In another screw-actuated embodiment, the inner blade assembly comprises telescopically mated inner and outer tubes, and the screw actuator comprises (a) a threaded rod reaching downwardly through a lower end of the inner tube and rotatably coupled to the outer tube below said lower end of the inner tube, and (b) internal threading carried on the inner tube in mated engagement with the threaded rod, whereby rotation of the threaded actuator in opposing directions raises and lowers the inner tube relative to the outer tube.

Preferably there is provided an actuator handle carried above the first telescopic blade assembly and coupled to the screw actuator for operation thereof.

Preferably the actuator handle is coupled to the screw actuator via a ratchet mechanism.

Preferably the actuator handle is pivotally mounted for movement between a stowed position hanging downwardly along the first telescopic blade assembly and a working position radiating outward therefrom.

Preferably the threaded actuator comprises an extension member reaching upwardly from the threaded rod to connect the actuator handle, the extension member being rotationally and telescopically coupled to the threaded rod, whereby the actuator handle is operable to drive rotation of the threaded rod via the extension member, and is displaceable upwardly and downwardly relative to the threaded member to ascend and descend with the surrounding inner tube.

According to a second aspect of the invention, there is provided an adjustable front fork system for a bicycle, tricycle or the like, the adjustable front fork system comprising:
a steerer tube for coupling to handlebars of the bicycle, tricycle or the like;
first and second telescopic blade assemblies residing on opposite sides of the steerer tube, each telescopic blade assembly comprising:
an outer blade unit having a hollow interior and an open upper end; and
an inner blade unit telescopically mated with the outer blade unit for displacement of the inner blade member back and forth within the hollow interior the outer blade unit to retract and extend the inner blade unit relative to the outer blade unit through the open upper end thereof;
a connection of the inner blade unit to the steerer tube at or adjacent an upper end of the inner blade unit that resides outside the hollow interior of the outer blade unit above the open upper end thereof; and
a wheel connector attached to the outer blade unit at a distance spaced downwardly from the open upper end thereof to support a respective end of a wheel axle of the bicycle, tricycle or the like that is to be carried between the blade assemblies, the wheel connector being adjustable in position along the outer blade unit;
a lockable gas spring assembly comprising:
a piston rod that at least partially defines the inner blade unit of the first telescopic blade assembly;
a cylinder that at least partially defines the outer blade unit of the first telescopic blade assembly, and in which a piston of the piston rod is slidably disposed between volumes of oil on either side of the piston and a volume of gas on one side of the piston; and
a lock release mechanism comprising a release pin passing axially through the piston rod from an upper end located outside the cylinder to an inner end inside the cylinder, where the release pin carries a valve that has a normally closed position blocking a through-port of the piston by which the two volumes of oil are communicated across the piston when the through-port is opened;
whereby depression of the upper end of the release pin of the lockable gas spring allows the oil to flow across the piston, thereby releasing a locked condition between the piston rod and actuator to allow telescopic displacement of the inner blade units back and forth within the outer blade units that changes a height of the adjustable fork measured between a top end of the steerer tube and lower ends of the telescopic blade assemblies.

According to a third aspect of the invention, there is provided a front fork system for a bicycle, tricycle or the like, the system comprising:
a steerer tube;
a pair of telescopic blade assemblies attached to the steerer tube and comprising at least one lockable gas spring operable to enable extension and collapse of the telescopic blade assemblies under operation of a lock-release mechanism of the at least one lockable gas spring; and
wheel connectors mounted to the telescopic blade assemblies and relocatable to any of a plurality of different positions therealong to accommodate mounting of any one of a number of differently sized wheels between the blade assemblies.

BRIEF DESCRIPTION OF THE DRAWINGS

In the accompanying drawings, which illustrate exemplary embodiments of the present invention.

DETAILED DESCRIPTION OF PREFERRED EMBODIMENTS

Figure 1:
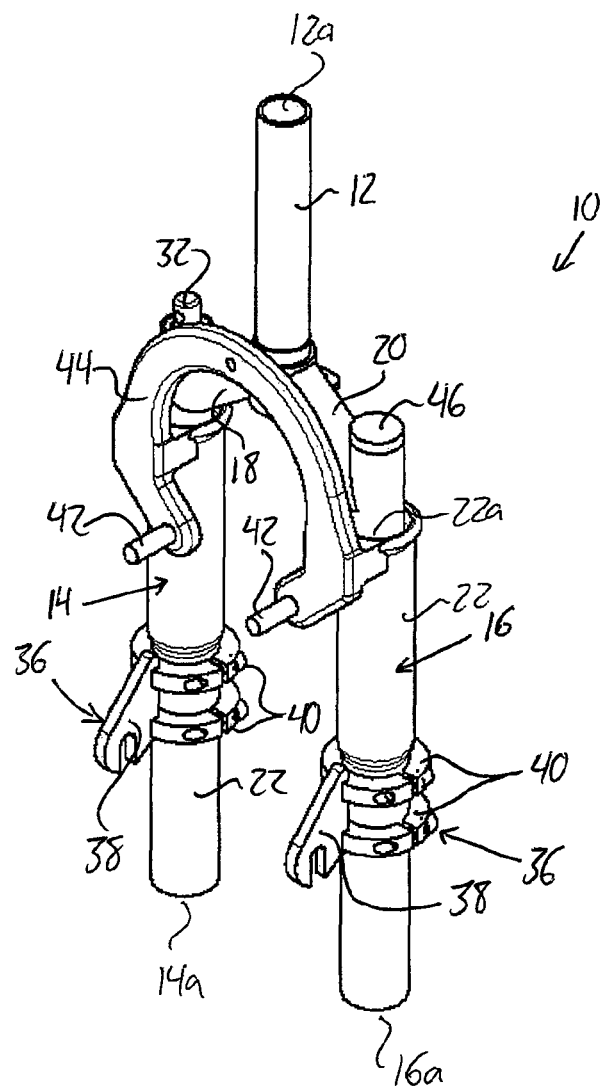
FIG. 1 is a front perspective view of a first embodiment adjustable fork assembly featuring a gas spring actuator and shown in a collapsed minimum-height condition.

FIG. 1 shows an adjustable fork assembly 10 of the present invention, which features a steerer tube 12 lying in a central vertical plane of the fork for connecting the fork to a handlebar of a bicycle or tricycle in a conventional manner for rotation of the fork assembly about the central longitudinal axis of the steerer tube 12 in order to steel the bicycle or tricycle. A pair of telescopic assemblies 14, 16 are joined to the lower end of the steerer tube 12 by a fork crown that is defined by a pair of diverging branch tubes 18, 20 forming a shallow, inverted V-shape depending from the lower end of the steerer tube 12, whereby the two telescopic assemblies 14, 16 defines the blades of the fork between which the front wheel of the bicycle or tricycle is to be supported.

Figure 2:
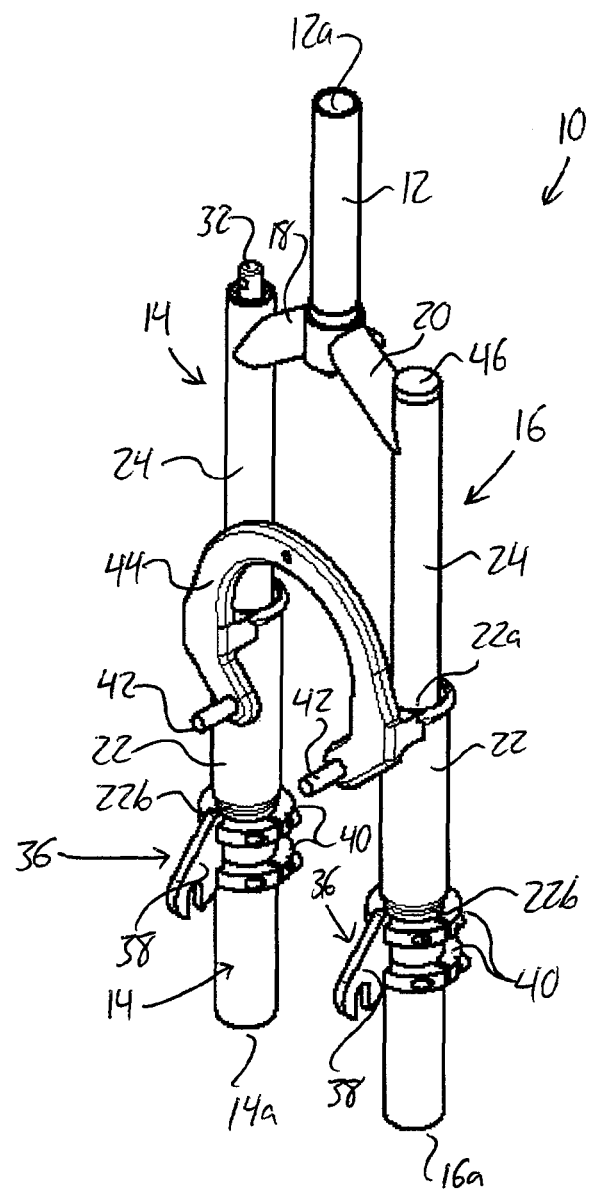
FIG. 2 is a front perspective view of the first embodiment fork assembly an extended maximum-height condition.

By way of telescopic length-adjustment action of the two blade assemblies 14, 16, the overall height of the fork assembly 10 measured between the top end 12a of the steerer tube 12 and the bottom ends 14a, 16a of the telescopic blade assemblies is likewise adjustable. FIG. 1 shows the fork assembly 10 collapsed into a compact configuration of minimum height, while FIG. 2 shows the fork assembly 10 extended into an elongated configuration of maximum height. This adjustability allows the height of the front end of a bicycle, tricycle or the like to be raised and lowered between a lowest possible position shown in FIG. 7 and a highest possible position shown in FIG. 8, thereby adjusting a tilt angle of the overall bicycle/tricycle frame and the seat carried thereon in order to provide user adjustability of the overall bicycle/tricycle geometry.

Turning back to FIG. 2, each one of the telescopic blade assemblies 14, 16 features an outer blade tube 22 with a hollow interior passing axially therethrough from an open upper end 22a to an opposing open lower end of the outer blade tube. This lower end of the outer blade tube 22 defines the bottom end 14, 16a of the respective overall blade assembly 14, 16. As shown, the outer blade tube may have a tapered neck portion 22b at an intermediate location therealong at which the inner and outer diameters transition from a greater diameter at an upper half of the outer blade tube 22 to a small diameter at a lower half of the outer blade tube. A cylindrical inner blade tube 24 of each telescopic blade assembly 14, 16 is telescopically received in the hollow interior of the respective outer blade tube 22 through the open upper end 22a thereof. In preferred embodiments, the open upper end of the outer blade tube 22 may house an internal slide bushing (not shown) in order to maintain alignment between the inner and outer blade tubes and provide a low-friction sliding fit therebetween.

Figure 9:
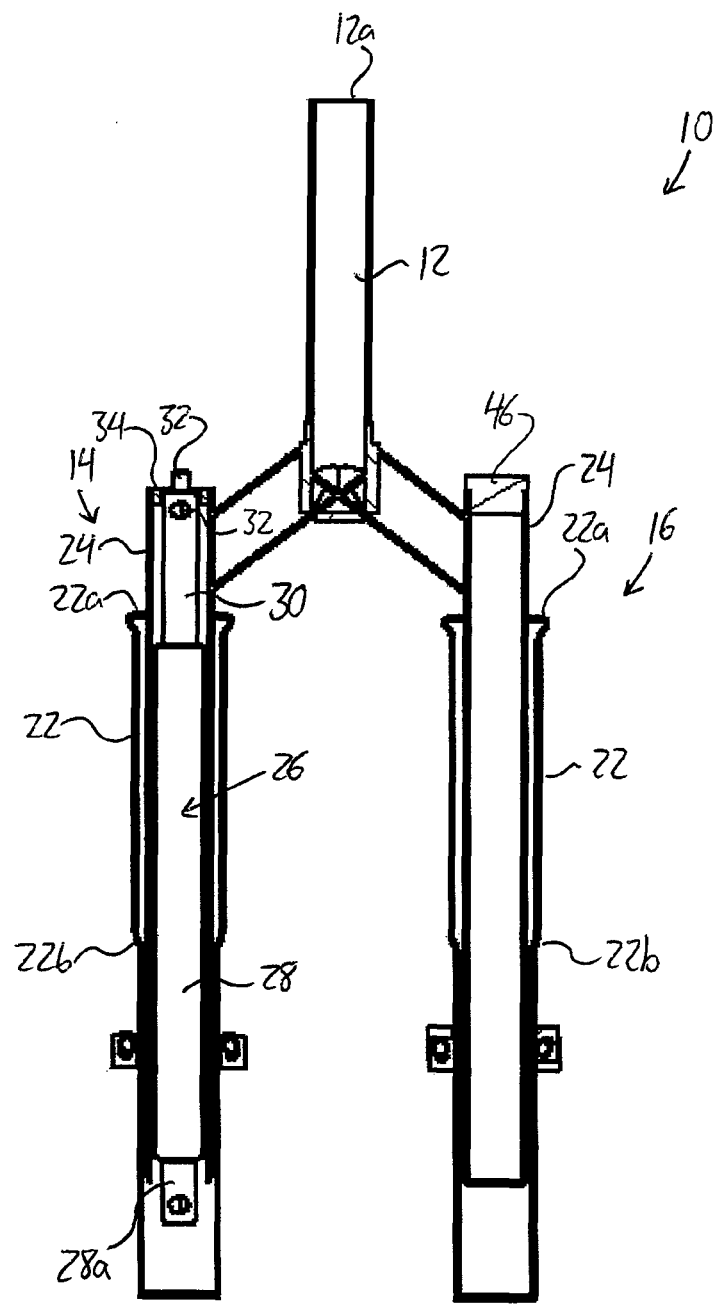
FIG. 9 is a cross-sectional view of the first embodiment adjustable fork assembly as seen along line IX-IX of FIG. 8.
Figure 10:
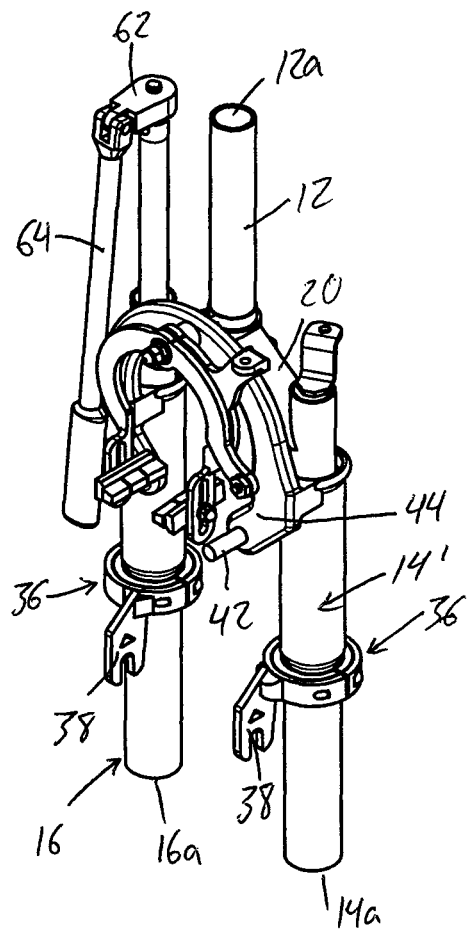
FIG. 10 is a front perspective view of a second embodiment adjustable fork assembly with a screw actuator.
Figure 11:
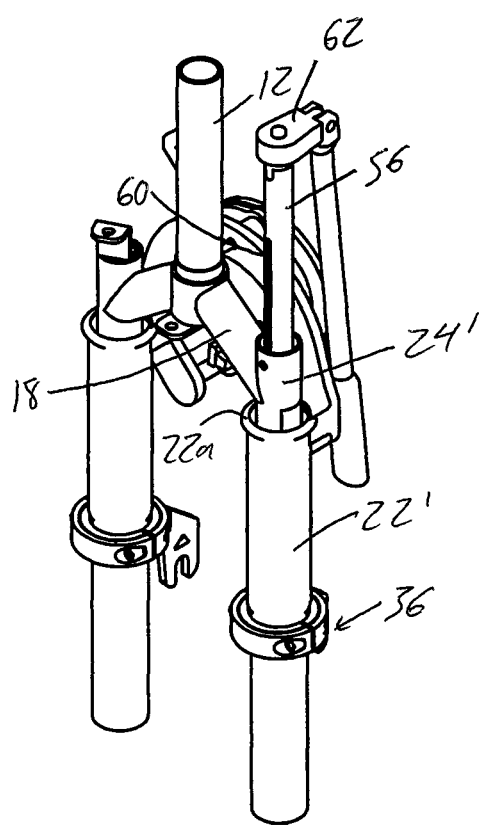
FIG. 11 is a rear perspective view of the second embodiment adjustable fork assembly.
Figures 12, 13:
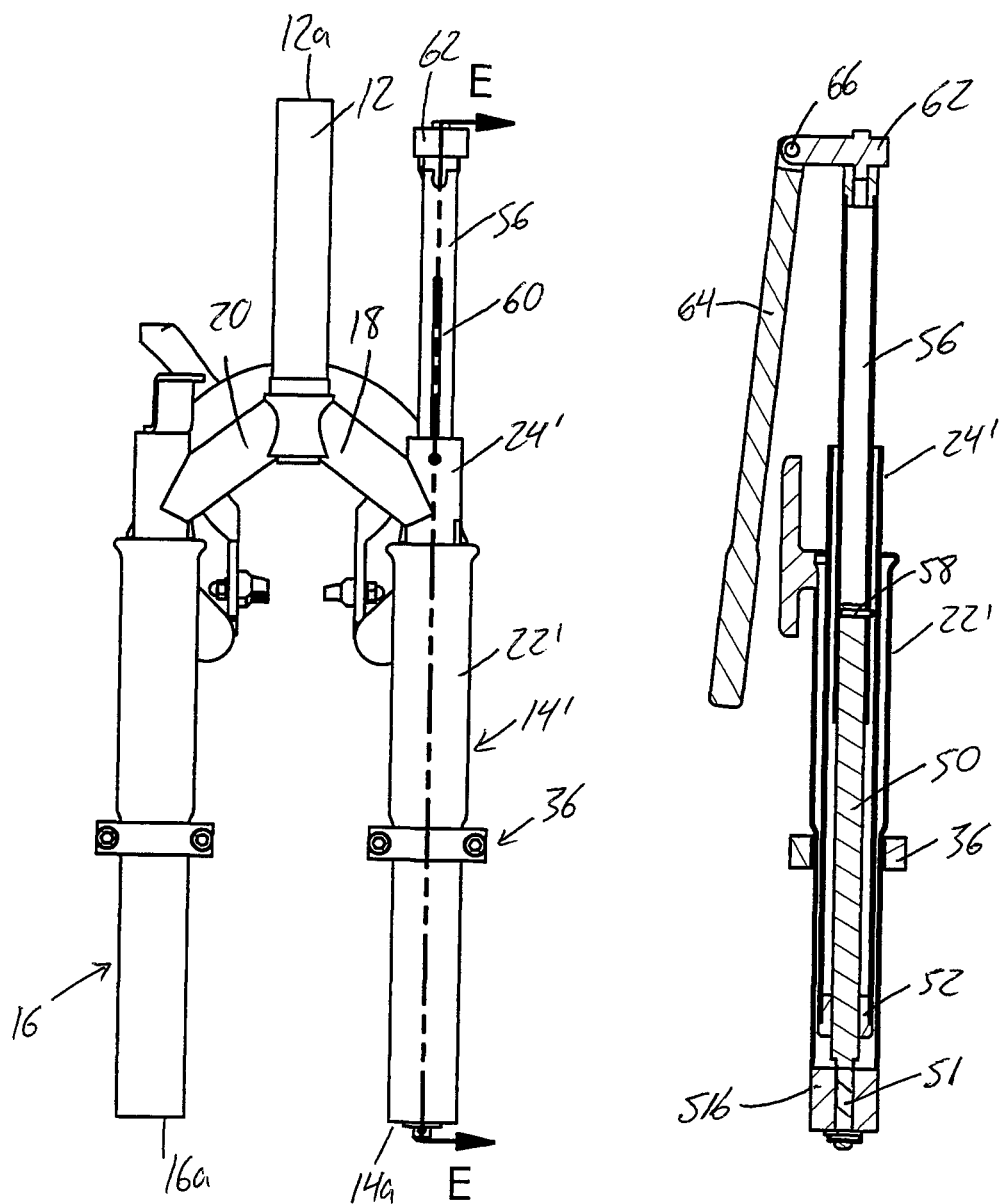
FIG. 12 is a rear elevational view of the second embodiment adjustable fork assembly.
FIG. 13 is a cross-sectional view of the second embodiment adjustable fork assembly as viewed along line E-E of FIG. 12.

As best seen in FIG. 9, a first one 14 of the telescopic blade assemblies 14, 16 features a lockable gas spring 26 cooperatively installed with the inner and outer blade tubes 22, 24 in order to drive the telescopic extension action of the blade assembly in order to a achieve a user-desired fork height and automatically lock the fork at this selected height. A cylinder 28 of the gas spring 26 resides fully within the hollow interior of the outer blade tube 22 and is attached to the outer blade tube 22 by fastening of the cylinder's end fitting 28a to the outer blade tube 22 near the bottom end thereof. The cylinder 28 of the gas spring 26 is thus held in fixed position relative to the outer blade tube 22. The gas spring 26 is oriented piston-rod up so that its piston rod 30 telescopically extends and retracts through an open upper end of the cylinder 28 at which a sliding seal is maintained between the cylinder 28 and piston rod 30.

The inner blade tube 24 of the first telescopic blade assembly 14 closes concentrically around the gas spring 26 from the top end of the piston rod 30 down into the interior space of the outer blade tube 22, where it is concentrically and slidably disposed between the gas spring cylinder 28 and the surrounding outer blade tube 22. The piston rod 30, near its free upper end, is attached to the surrounding inner blade tube 24 at a location adjacent the top end thereof by a suitable fastener 32, whereby the piston rod 30 and inner blade tube 24 are maintained in fixed position relative to one another for movement together as one relative to the fixed-together gas spring cylinder 28 and outer blade tube 22.

The gas spring 26 is of a known type that rigidly locks in its direction of extension (i.e. in a pull direction in which the piston rod 30 extends from the cylinder 28). The locking action occurs automatically, and a lock-release actuator is defined by a top end of a release pin 32 that passes axially through the piston rod 30 from an opening at the top end thereof downwardly through the piston that is carried inside the cylinder 28 at the internal lower end of the piston rod 30. At the face of the piston opposite that from which the piston rod 30 extends, the lower internal end of the release pin 32 carries a valve that is biased into a normally closed position against the piston face in order to close-off an oil flow-through passage in the piston. A volume of oil is contained within the cylinder above the piston of the piston rod, and another volume if oil is likewise contained within the cylinder below this piston. Beneath the lower volume of oil, a floating piston separates the oil from an underlying charge of compressed gas, such as nitrogen.

The piston rod is normally held in static condition since the incompressible oil contained between its piston and the sealed off upper end of the cylinder prevents upward movement of the piston under the upward force exerted thereon by the oil in the lower chamber as a result of the pressurized gas therebeneath. However, when the top end or head of the release pin 32 located outside the top end of the piston rod 30 is depressed, this opens up the valve in the piston, whereby oil is now free to pass from the upper oil chamber into the lower oil chamber at a metered rate through the flow-through passage, thereby allowing controlled upward movement (i.e. extension) of the piston rod under the action of the pressurized gas.

Depression of the control pin 32 enables automatic extension of the piston rod, thus lifting the inner blade tube 24 of the first telescopic blade assembly 14 relative to the outer blade tube 26 thereof in order to extend the length of this blade assembly 14, which likewise extends the other blade assembly 16 by an equal amount due to the fixed connection provided between the inner blade tubes 24 of the two blade assemblies 14, 16 by the crown and steerer tubes 12, 18, 12. When the desired fork height is achieved through this extension of the gas spring, the user releases the head of the control pin 32, thereby re-closing the piston valve in order to once again lock the blade length (and thus the fork height) at this particular height by closing off the flow-through passage in the piston.

To perform the reverse collapse or retraction of the blade assemblies 14m 16 to reduce the height of fork assembly 10, the user likewise depresses the control pin 32 in order to enable oil to pass through the piston of the piston rod 30 in the reverse direction, and applies sufficient downward force on the inner blade tube 24 to overcome the upward force of the pressurized gas so as to drive the inner blade tubes 24 downwardly into the outer blade tubes 22. The crown tubes 18, 20, steerer tube 12 and bicycle/tricycle handlebars are thus lowered through this action due to their attachment to the inner blade tubes 24. With the control pin 32 held in the depressed position, the driving downforce of this height-reducing collapse of the adjustable fork 10 may be applied via the handlebars of the bicycle/tricycle.

The gas spring 26 described above is of a well-known commercially available type, and so no internal details of the gas spring are shown in the appended drawings. The described lockable gas spring, in which pressurized gas is found only below the piston acts to drive the piston rod in the direction of extension, provides rigid locking of the piston rod in the extension direction, as there is only incompressible oil located between the piston of the piston rod and the upper end of the cylinder. A small range of movement in the collapse direction is allowed in the locked state of the gas spring however, as the gas at the bottom end of the cylinder can be compressed to some degree under application of sufficient downforce on the handlebars, whereby the fork provides a small degree of suspension to the front end of the bicycle/tricycle.

This use of a compression gas spring 26 with an upwardly extending piston rod 30 and pressurized gas located in the bottom end of the cylinder 28 to drive the piston rod in the extension direction eases the process of raising the fork by not relying on applied upward force from the user, and by using gravity to aid in the fork lowering action. However, it will be appreciated that other embodiments may use other gas spring configurations. For example, another embodiment may likewise employ a compression (i.e. self-extending) gas spring, but may invert its orientation from that of the illustrated gas spring embodiment by instead attaching the piston rod 30 to the outer blade tube 22 and attaching the cylinder 24 to the inner blade tube 24. In such an example, the head of the release pin 30 may be accessible at a lower open end of the outer blade tube 22 in order to provide the lock-release function. Another gas spring embodiment may instead employ a tension (i.e. self-retracting) gas spring, in which case the fork retraction force (instead of the extension force) is automatically provided by the pressurized gas of the gas spring, and the fork extension relies on a user-applied upward pulling force to overcome the bias of the pressurized gas. As with a compression gas spring, a tension gas spring may be installed in either orientation.

In the illustrated gas spring embodiment, the control pin 32 reaches upwardly from the top end of the inner blade tube 24 through a seal 34 that otherwise closes off the top of the inner blade tube 24 in the annular space around the release pin in order to seal off this annular space between the piston rod 30 and the surrounding inner blade tube 24. Remote-control lock release actuators are known in the art and may be employed to allow user-control of the lock release function from a location remote distanced from the actual release pin 32 itself, for example using a Bowden cable or hydraulic fluid line. In such an instance, release of the gas spring lock may be accomplished, for example, from the handlebars of the bicycle/tricycle, which can then also be used to apply suitable downforce to collapse the adjustable fork to a desired lower height.

A pair of wheel connectors 36 are respectively installed on the two telescopic blade assemblies 14, 16 to support opposing ends of a wheel axle between the two blade assemblies for rotation of the wheel about said axle in the space between the blade assemblies 14, 16 beneath the crown and steerer tubes 18, 20, 12. In the illustrated embodiments, the wheel connectors 36 each feature a dropout plate 38 with a downwardly opening vertical dropout slot, and two circumferential clamps 40 fixed to the dropout plate 38 and closing about a shared axis parallel to the vertical plane of the dropout plate and the vertical axis of the dropout slot. The circumferential clamps are dimensioned to provide a tight clamping action on the outer circumference of the smaller-diameter lower halves of the outer blade tubes 22, thereby securely fastening each wheel connector 36 to its respective blade assembly 14, 16, while allowing loosening of the wheel connector 36 from its clamped condition and sliding of same axially along the lower half of the outer blade tube 22 to a new position along the uniform diameter exterior of the tube's lower half. The tapered transition or neck 22b at the exterior of the outer blade tube 22 provides a stop which the respective wheel connector can be slid up against to define an uppermost achievable position of the wheel connector on the respective outer blade tube 22.

At or near the top end 22a of each outer blade tube 22, a respective brake mount tab or post 42 projects forwardly away from the blade tube 22 to provide a mounting site for a respective brake pad of a cantilever style wheel rim brake. In the illustrated embodiments, both tabs/posts 42 are defined on a bracket 44 that has the shape of an inverted-U or horseshoe, and is fixed to the front faces of the two outer blade tubes 22 just below the upper ends 22a thereof so that the bracket 44 embraces over the front wheel tire of the bicycle tricycle a short distance thereabove. It will be appreciated however that similar mounting tabs/posts for a cantilever brake may be attached to the outer blade tubes by other means. However, use of such a mounting bracket 44 allows optional provision of a central mounting post or tab at the peak of its arc-shaped span over the tire, instead of the illustrated use of two cantilever brake mounting posts/tabs 42 further down, whereby a caliper-style brake mounted on the central post overtop of the wheel can be used instead of a cantilever style brake with independently supported pads on opposing sides of the wheel.

The brake mounting bracket 44 is fixed in position relative to the outer blade tubes 22, while the wheel connectors 36 are adjustable in position therealong to any of a number of user-selectable clamping sites between the lower end 14a, 16a of the blade assembly 14, 16 and the outer-diameter transition at the tapered neck 22b of the outer blade tube 22. Use of circumferential clamps 40 for the wheel connectors provides infinite adjustability of their position within this available range of movement, just as the use of a lockable gas spring to provide the locking action of the fork extension/retraction functionality allows for infinite adjustability of the fork height within the allowable range of movement between the inner and outer blade tubes. The allowable relative movement between the brake mounting arrangement 42, 44 and the wheel connectors 36 allows the fork to accommodate various wheels sizes by allowing adjustment of the wheel axle position defined by the wheel connectors relative to the rim-brake position defined by the one or more posts/tabs 42 at the mounting bracket 44.

Figure 3:
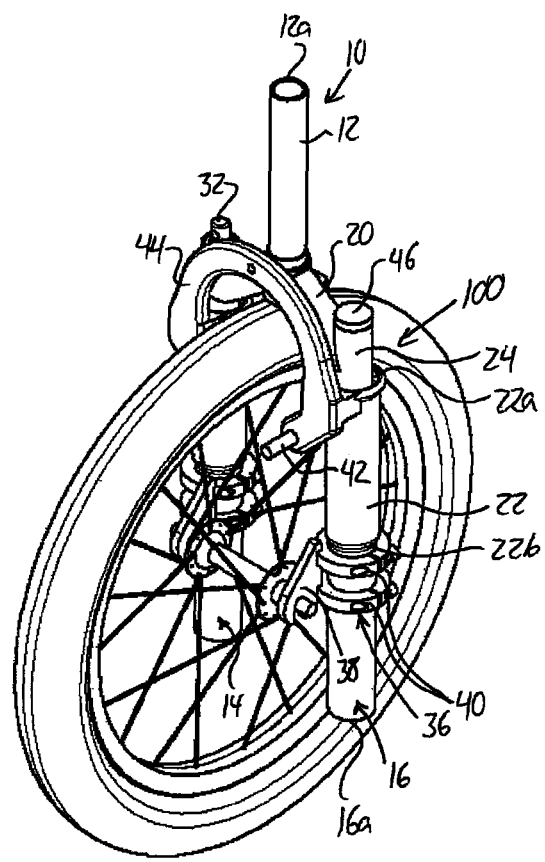
FIG. 3 is a front perspective view of the first embodiment fork assembly in the collapsed minimum-height condition with a 16-inch wheel installed.
Figure 4:
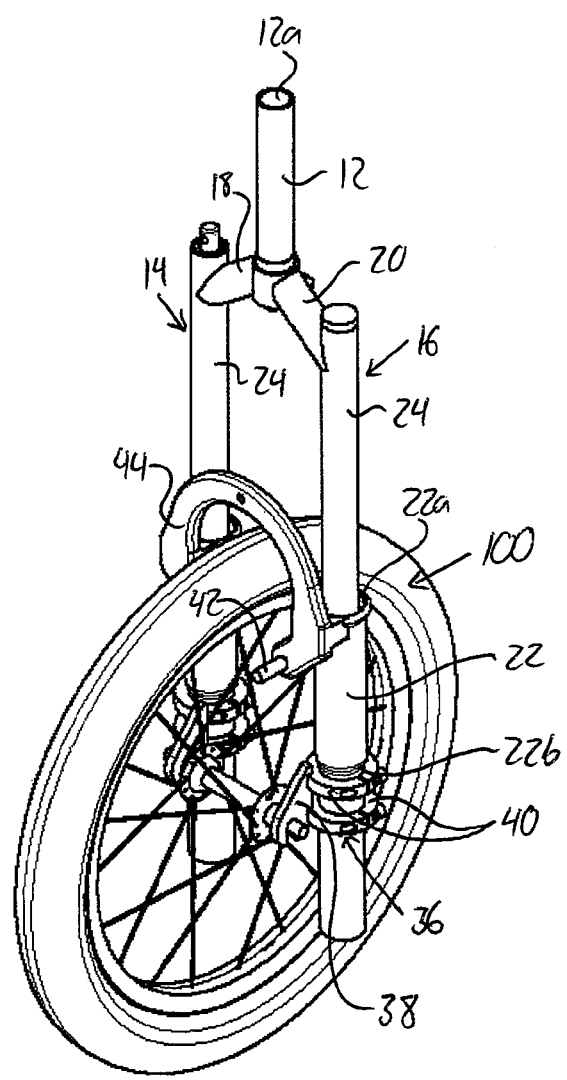
FIG. 4 is a front perspective view of the first embodiment fork assembly in the extended maximum-height condition with the 16-inch wheel installed.

To illustrate this point, attention is turned to FIGS. 3 and 4, which show the wheel connectors 36 as being clamped at their highest possible positions on the outer blade tubes 22, i.e. in abutment with the tapered necks 22 thereof, thereby corresponding to a minimum achievable distance between the dropouts 38 and the brake mounting bracket 44, which dictates a minimum wheel size with which the fork is compatible. FIGS. 3 and 4 show a minimum-diameter wheel 100 installed on the dropouts, which thus places the brake mounting tabs/posts 42 in-line with the rim of the tire. That is, the distance from the rotational axis of the wheel axle to the rim of the wheel corresponds to the distance from the dropout slots to the cantilever brake mounting posts.

Figure 5:
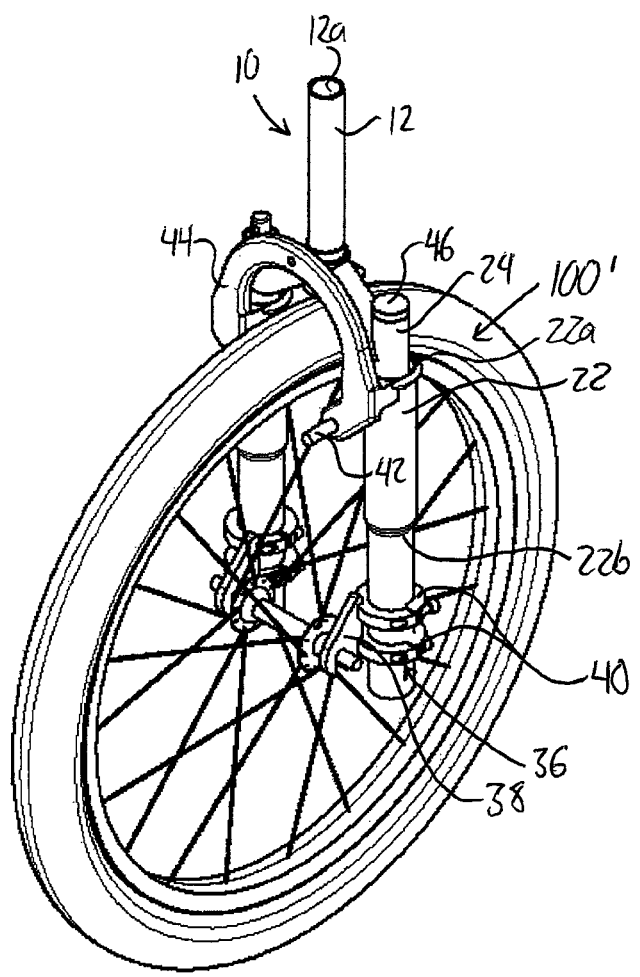
FIG. 5 is a front perspective view of the first embodiment fork assembly in the collapsed minimum-height condition with a 20-inch wheel installed.
Figure 6:
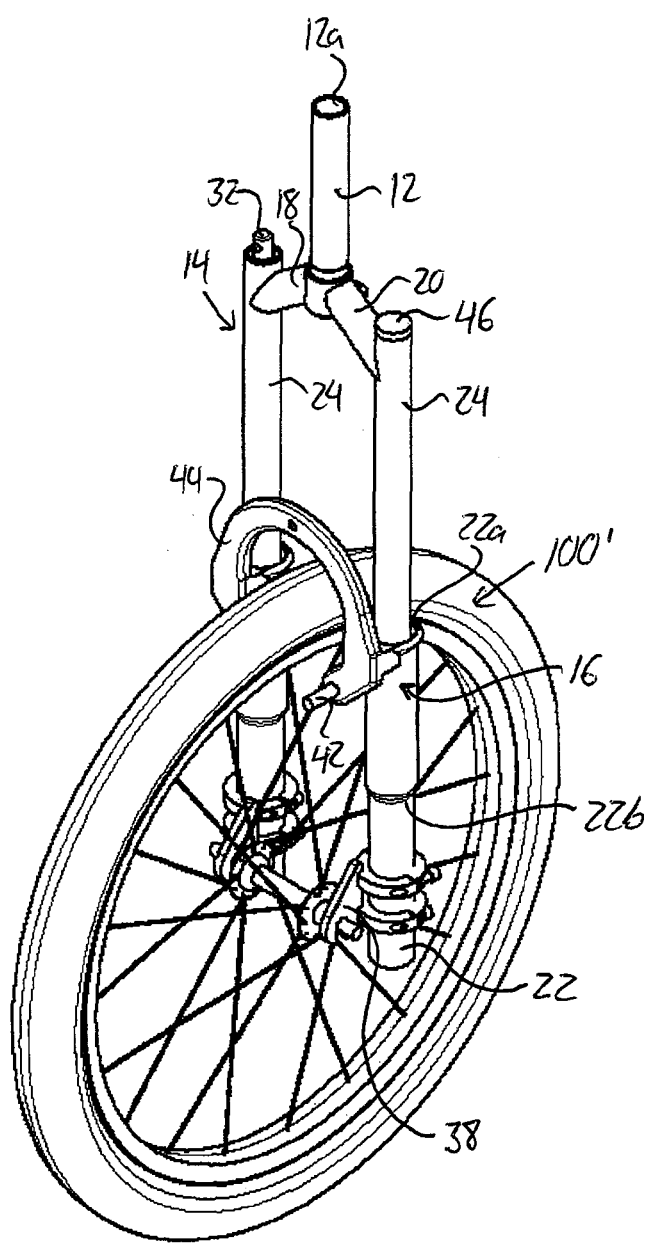
FIG. 6 is a front perspective view of the first embodiment fork assembly in the extended maximum-height condition with the 20-inch wheel installed.

Turning to FIGS. 5 and 6, a larger wheel 100' is accommodated by loosening the clamps 40 of the wheel connectors 36, sliding the connectors 36 further down the outer blade tubes 22 to positions nearer to the lower ends 14a, 16a thereof, and re-tightening the clamps at these positions in which the dropout-to-brake-post distance corresponds to the axle to rim diameter of the larger wheel. The attachment of the brake mounting features 42, 44 to the same outer blade tube 22 as the wheel connectors 36 means that no adjustment is required of the wheel and brake mounting features when the telescopic blade assemblies 14, 16 are extended and retracted to increase and decrease the overall height of the fork 10.

One embodiment may feature a maximum travel range of 10-inches in the height adjustment of the fork, and accommodates any wheel size between 16-inches and 20-inches. Another embodiment may provide sufficient adjustability of the wheel connectors 36 to accommodate wheel sizes between 12-inches and 29-inches. It will be appreciated that these numerical values are presented for the purpose of example only, and are not intended to limit the scope of the present invention, as set forth in the appended claims.

Figure 7:
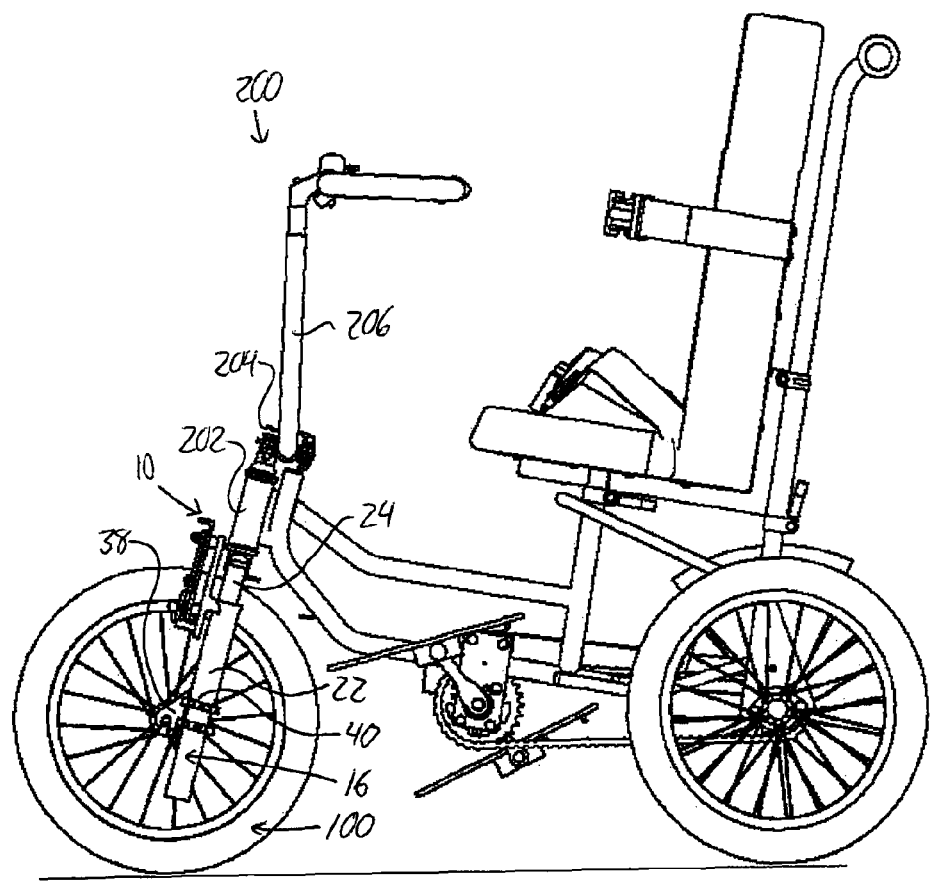
FIG. 7 is a side profile view of a tricycle with the adjustable fork assembly of FIG. 3 in the collapsed minimum height condition to set the tricycle frame in a generally horizontal orientation.
Figure 8:
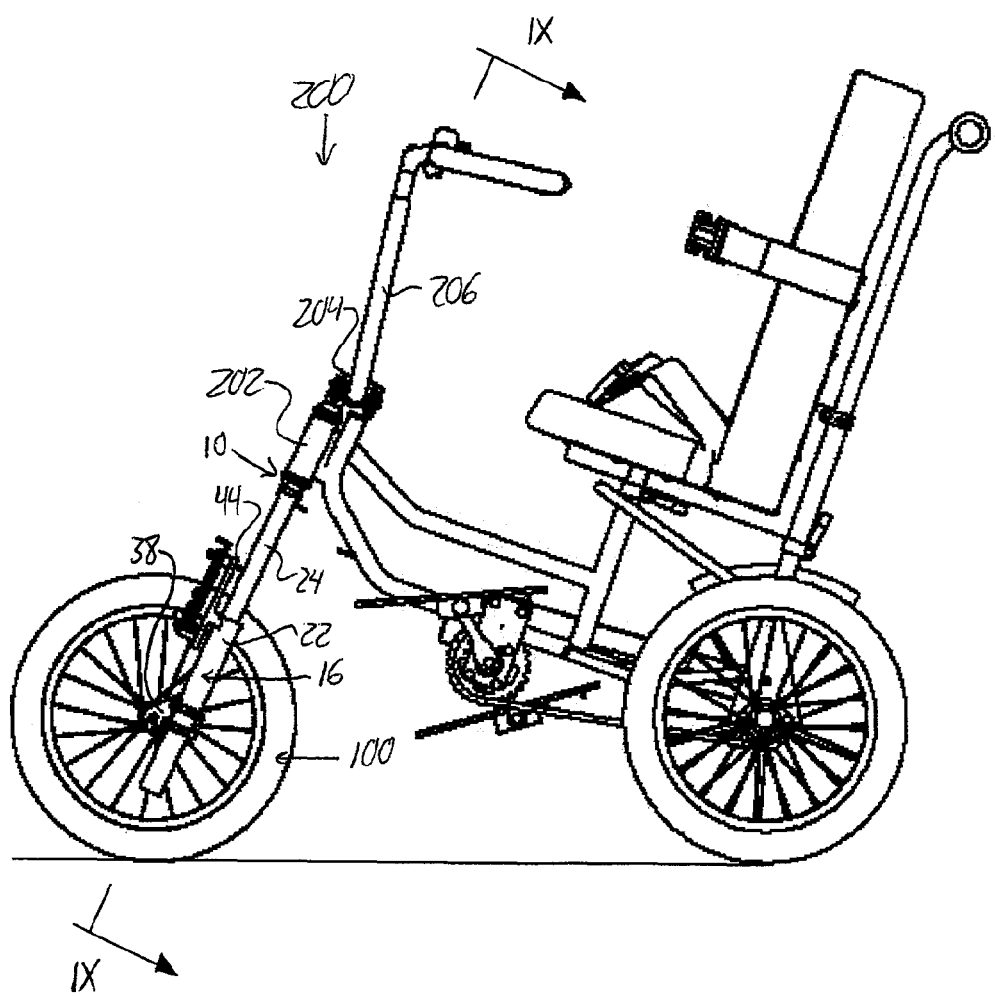
FIG. 8 is a profile view of the tricycle of FIG. 7 with the adjustable fork assembly in the extended maximum height condition to raise the front end of the tricycle frame into a more tilted orientation.

FIGS. 7 and 8 show the adjustable fork 10 installed on a tricycle 200 by rotatable receipt of the steerer tube 12 in the head tube 202 of the tricycle frame and coupling of the steerer tube 12 to a stem 204 that is connected to the handlebars 206 for steering of the tricycle through the front fork 10. The details of such connections in conventional tricycle and bicycle design are well known, and thus not described in detail herein. Comparison of the two figures illustrates how extension and collapse of the adjustable fork 10 allows raising and lowering of the front end of the bicycle/tricycle 200, thereby providing control over the tilt angle of the bicycle/tricycle frame relative to ground level to allow user-adjustment of the overall bicycle/tricycle geometry. The variable wheel size accommodation provides further adjustability for a given bicycle/tricycle, or allows use of the identical fork unit among different bicycle/tricycle models of varying wheel size.

The infinite adjustability of the illustrated embodiments provides optimal user control both in relation to the fork height and the relative positioning of the wheel axle support and brake support elements for optimal wheel size capabilities and fine tuning of rim/brake position. It will be appreciated however the other embodiments of reduced flexibility could alternatively employ fork height and wheel size adjustment mechanisms of a predetermined, finite number of selectable positions at which the inner and outer tubes can be locked and the wheel connectors can be attached, instead of employing the infinitely length adjustable gas-spring and infinitely position adjustable circumferential wheel connector clamps. For example, in another embodiment, for either adjustment, alignable sets of holes may be used in cooperation with selectively insertable and removable lock pins to set a 'locked' blade length and/or wheel connector position.

Although the illustrated gas spring embodiment features only a single gas spring 26, other embodiments may employ gas springs at both telescopic blade assemblies 14, 16, and for example employ a split Bowden cable or split hydraulic line to control both gas springs from a single actuator for operation of the two gas springs in unison. The illustrated gas-spring embodiment features telescopic inner and outer blade tubes 22, 24 at both blade assemblies, whereby the gas spring equipped blade assembly 14 substantially matches the visual appearance of the second unpowered blade assembly 16, except for the exposed release pin 32 at the top end of the active assembly 14 versus a capped top end 46 the passive assembly 16. This also has the advantage of enclosing the piston rod 30 of the gas spring 26 in order to prevent exposure thereof to the elements and/or abrasives, thereby preventing wear or other detriment to the smooth extension/collapse functionality of the gas spring, and allowing use of identical wheel connector clamps 40 for both blade assemblies since they both feature the same size outer tube 22 to which the wheel connectors 36 are clamped.

However, it may be possible in other embodiments to forgo use of one or both of the blade tubes in conjunction with the gas spring, and for example simply rely on the cylinder 28 of the gas spring to define a tubeless outer blade unit in which an unsheathed piston rod 30 is telescopically received to define the corresponding tubeless inner blade unit. In one such embodiment, the piston rod would attach directly to the fork crown 18, 20, and the respective wheel connector 36 could clamp to the exterior of the gas spring's cylinder 28.

In other embodiments, infinite adjustability may be provided using an actuator other than a gas spring. For example, in one such embodiment (not illustrated) the inner blade unit of one fork blade is an externally threaded screw shaft that is rotatably coupled to the crown of the fork for rotation of the screw shaft about its longitudinal axis. The outer blade unit of the same fork blade is a tube on which the wheel connector is externally mounted, and which features internal female threading over at least part of the tube's axial length. The threading may be integrally formed on the tube or defined on an insert fixed inside the tube. The screw shaft is threaded into the internal threading of the outer tube, whereby rotation of the screw shaft in opposing directions, for example via a manual handle at the upper end thereof above the crown of the fork, telescopically extends and retracts the screw shaft relative to the outer tube to adjust the fork height. In this embodiment, the external threaded of the inner blade unit and the internal threading of the outer blade unit thus cooperate to form a screw actuator for adjusting the fork height. Such a screw-actuated blade assembly may take the place of the gas-spring assembly on one side of the illustrated fork, with the other non-actuated blade assembly having the same structure shown in the drawings of the illustrated embodiment. In view of this screw-actuated embodiment, it will be appreciated that when used herein, the term telescopic is not limited to purely axial/longitudinal movement that is free of rotational movement about the longitudinal axis, although in some embodiments, such as the illustrated gas spring embodiment, the inner and outer blade units of each blade assembly do not rotate relative to one another. It will also be appreciated that telescopically extendable and retractable embodiments without wheel-size adjustment means are also possible, in which case the wheel connectors 36 may be permanently fixed in place. In one such embodiment, the positions of the inner and outer tube in one or both of the blade assemblies may be reversed, whereby the inner tube would carry the wheel connectors at an exposed lower end of the inner tube that reaches downwardly from an open lower end of the outer tube, which in turn would be attached to the crown of the fork at the respective branch tube.

FIGS. 10 through 13 shows another screw-based embodiment, wherein one blade 14' of the fork features an inner tube 24' telescopically received in the outer tube 22' on which the wheel connectors 36 are mounted, similar to the illustrated gas-spring embodiment. With reference to the cross-section of FIG. 13, instead of internal threading on the outer tube and external threading on the inner tube, as described above for the non-illustrated screw embodiment, the second illustrated embodiment features a screw actuator having an externally threaded rod 50 that extends out from the lower end of the inner tube 24' and onward to the lower end of the outer tube 22'. Here, the lower end of the threaded rod 50 is rotatably coupled to the outer tube's lower end to allow rotation of the threaded rod 50 about the shared longitudinal axis of the inner and outer tubes. To accomplish this, the illustrated embodiment features an unthreaded tip 51a at the bottom of the otherwise threaded rod 50, which passes through a bushing or bearing 51b housed in the bottom end of the outer tube 22'.

An internally threaded nut or insert 52 is affixed to the inner tube 24' at the lower end thereof to define a set of internal threads thereon, and is in mating threaded engagement with the external threading of the rod 50. The screw actuator features an extension tube 56 concentrically and telescopically disposed over the threaded rod 50. The extension tube 56 is rotationally coupled to the threaded rod 50 by a slide pin 58, whereby the threaded rod 50 and the extension tube 56 rotate together as a singular unit. In rotationally coupling the threaded rod 50 and extension tube together, the slide pin 58 projects radially outward from the threaded rod 50 near the upper end thereof, and extends through a longitudinal slot 60 in the extension tube 56. The extension tube 56 can thus telescopically slide along the threaded rod 50 in upward and downward directions.

A ratchet head 62 is mounted to the top end of the extension tube 56 that resides outside the outer tube 24' at a distance thereabove. A longitudinal bar-like or lever-like handle 64 for manually driving the screw actuator is coupled to the ratchet head 62 by a horizontal pivot pin 66, whereby the handle 64 can pivot about a horizontal axis between a stowed position hanging downward from the ratchet head 62 alongside the respective blade of the fork (as shown in the drawings), and a working position extending radially outward from the extension tube 56 in order to drive rotation of the screw actuator via the ratchet head 62. The drawings show the extension tube 56, ratchet head 62 and handle 64 in a raised condition lifted from their normal default position, in which the ratchet head 62 normally rests on the top end of the inner tube 24'.

One of the crown tubes 18 attaches to the inner tube 24' of the telescopic blade assembly near the upper end of the inner tube 24' that resides outside the upper end of the outer tube 22'. When the handle 64 and ratchet 62 are used to drive rotation of the screw actuator, the threaded engagement between the threaded rod 50 of the screw actuator and the threaded nut or insert 52 of the inner tube 24' causes the inner tube 24' to ascend or descend along the threaded rod 50, thereby lifting or lowering the crown of the fork. The illustrated screw-based embodiment is therefore similar to the unillustrated screw embodiment described above in that the inner blade unit 24' is raisable and lowerable by way of a threaded connection between the inner and outer blade units 24', 22', but uses an externally threaded member 50 attached to the outer unit 24' and an internally threaded member 52 attached to the inner unit instead of having internal threading on the outer unit and internal threading on the inner unit.

Like the gas spring actuator of the first embodiment, the screw actuator of the illustrated screw embodiment is disposed inside the inner tube of the actuated blade of the fork, and has its lower end affixed to the outer tube near the lower end thereof. However, the screw actuator is not affixed to the inner tube 24', as the handle-carrying extension tube 56 of the screw actuator needs to be upwardly displaceable with the inner tube 24' on which the ratchet head 62 normally rides. In an alternate embodiment, a sliding fit between extension tube 56 and threaded rod 50 could be avoided by having the ratchet head remain at a fixed position relative the outer tube at a sufficient height to accommodate the inner tube's full range of motion. In such embodiments, the handle-carrying extension need not be a hollow tube slidably disclosed over the threaded rod 55, and could just be an integral extension of the threaded rod 50 itself. However, the illustrated embodiment has the advantage of minimizing the projecting height of the handle-carrying extension 56 at any given time, and also benefits from the use of a light-weight hollow tube to connect the handle to the heavier threaded-rod of the actuator.

Since various modifications can be made in my invention as herein above described, and many apparently widely different embodiments of same made within the scope of the claims without departure from such scope, it is intended that all matter contained in the accompanying specification shall be interpreted as illustrative only and not in a limiting sense.

The invention claimed is:

1. An adjustable front fork system for a bicycle or tricycle comprising:
   a steerer tube for coupling to handlebars of the bicycle or tricycle;
   first and second telescopic blade assemblies residing on opposite sides of the steerer tube, each telescopic blade assembly comprising:
      an outer blade unit having a hollow interior; and
      an inner blade unit telescopically mated with the outer blade unit for sliding movement of the inner blade member back and forth within the hollow interior the outer blade unit to retract and extend the inner blade unit relative to the outer blade unit through an open end thereof;
   a connection of either the outer blade unit or the inner blade unit to the steerer tube at or adjacent an upper end of the blade assembly; and a wheel connector attached to the other one of either the outer blade unit or inner blade unit at a distance spaced downwardly from the connection toward a lower end of the blade assembly to support a respective end of a wheel axle of the bicycle or tricycle that is to be carried between the blade assemblies;

whereby telescopic displacement of the inner blade members back and forth within the outer blade units changes a height of the adjustable fork measured between a top end of the steerer tube and the lower ends of the telescopic blade assemblies; and wherein the first blade assembly further comprises a locking or limiting device operable to prevent or limit movement between the outer blade unit and inner blade unit in order to lock or limit adjustment of the height of the fork, the inner and outer blade units of the first telescopic blade assembly respectively comprise a piston rod and cylinder of a lockable gas spring assembly, and the locking or limiting device comprises a release pin of the lockable gas spring assembly, a head of which protrudes upward from a top end of the piston rod to define a lock-release actuator at or adjacent the top end of the first telescopic blade assembly.

2. The adjustable front fork system of claim 1 wherein the first telescopic blade assembly further comprises a pair of telescopically mated tubes, each attached to a respective one of either the piston rod or the cylinder in a position closing circumferentially therearound.

3. The adjustable front fork system of claim 1 wherein the outer blade unit of the first telescopic blade assembly further comprises an outer blade tube in which the cylinder of the lockable gas spring is received and to which the cylinder of the lockable gas spring is attached.

4. The adjustable front fork system of claim 3 wherein the inner blade unit of the first telescopic blade assembly further comprises an inner blade tube that closes around the lockable gas spring, is attached to the piston rod thereof and is telescopically received in the outer blade tube.

5. The adjustable front fork system of claim 1 wherein the lockable gas spring, when locked, is rigidly locked in an extension direction.

6. The adjustable front fork system of claim 1 wherein the lockable gas spring, when locked, is rigidly locked in only an extension direction.

7. The adjustable front fork system of claim 1 wherein:
a piston of the piston rod is slidably disposed within the cylinder between volumes of oil on either side of the piston and a volume of gas on one side of the piston; and
the release pin passes axially through the piston rod from the head of the release pin located outside the cylinder to an inner end of the release pin located inside the cylinder, where the release pin carries a valve that has a normally closed position blocking a through-port of the piston by which the two volumes of oil are communicated across the piston when the through-port is opened;
whereby depression of the head of the release pin of the lockable gas spring allows the oil to flow across the piston, thereby releasing a locked condition between the piston rod and cylinder to allow telescopic displacement of the inner blade units back and forth within the outer blade units that changes the height of the adjustable fork.

8. An adjustable front fork system for a bicycle or tricycle comprising:

a steerer tube for coupling to handlebars of the bicycle or tricycle;

first and second telescopic blade assemblies residing on opposite sides of the steerer tube, each telescopic blade assembly comprising:
an outer blade unit having a hollow interior; and
an inner blade unit telescopically mated with the outer blade unit for sliding movement of the inner blade member back and forth within the hollow interior the outer blade unit to retract and extend the inner blade unit relative to the outer blade unit through an open end thereof;
a connection of either the outer blade unit or the inner blade unit to the steerer tube at or adjacent an upper end of the blade assembly; and
a wheel connector attached to the other one of either the outer blade unit or inner blade unit at a distance spaced downwardly from the connection toward a lower end of the blade assembly to support a respective end of a wheel axle of the bicycle or tricycle that is to be carried between the blade assemblies, whereby telescopic displacement of the inner blade members back and forth within the outer blade units changes a height of the adjustable fork measured between a top end of the steerer tube and the lower ends of the telescopic blade assemblies;
wherein a brake mount arrangement is carried on the steerer tube and arranged to support a rim brake of the bicycle or tricycle, and the wheel connectors and the steerer tube are adjustable in position relative to one another along the height of the adjustable fork independently of the telescopic displacement between the inner and outer blade units of each blade assembly.

9. The adjustable front fork of claim 8 wherein the brake mount arrangement is carried by the telescopic blade assemblies in a manner movable relative to the steerer tube via the telescopic displacement between the inner and outer blade units of each blade assembly, and the wheel connectors are selectively repositionable to any of a plurality of different positions along the blade assemblies.

10. The adjustable front fork system of claim 9 wherein the inner blade unit of each telescopic blade assembly is connected to the steerer tube and the wheel connector of each telescopic blade assembly is selectively repositionable to any of a plurality of different positions along the outer blade unit.

11. The adjustable front fork system of claim 8 wherein the wheel connectors each comprise a releasable and tightenable clamping mechanism operable to circumferentially clamp the wheel connectors to the blade assemblies.

12. The adjustable front fork system of claim 9 wherein the wheel connectors each comprise a releasable and tightenable clamping mechanism operable to circumferentially clamp the wheel connectors to the blade assemblies.

13. The adjustable front fork system of claim 10 wherein the wheel connectors each comprise a releasable and tightenable clamping mechanism operable to circumferentially clamp the wheel connectors to the blade assemblies.

14. An adjustable front fork system for a bicycle or tricycle comprising:
a steerer tube for coupling to handlebars of the bicycle or tricycle;
first and second telescopic blade assemblies residing on opposite sides of the steerer tube, each telescopic blade assembly comprising:
an outer blade unit having a hollow interior; and an inner blade unit telescopically mated with the outer blade unit for sliding movement of the inner blade member back and forth within the hollow interior the outer blade unit to retract and extend the inner blade unit relative to the outer blade unit through an open end thereof;

a connection of either the outer blade unit or the inner blade unit to the steerer tube at or adjacent an upper end of the blade assembly;

a wheel connector attached to the other one of either the outer blade unit or inner blade unit at a distance spaced downwardly from the connection toward a lower end of the blade assembly to support a respective end of a wheel axle of the bicycle or tricycle that is to be carried between the blade assemblies, whereby telescopic displacement of the inner blade members back and forth within the outer blade units changes a height of the adjustable fork measured between a top end of the steerer tube and the lower ends of the telescopic blade assemblies;

wherein the first telescopic blade assembly comprises a screw actuator operable to effect the telescopic displacement between the inner and outer blade units, and an actuator handle is carried above the first telescopic blade assembly and coupled to the screw actuator via a ratchet mechanism.

15. The adjustable fork system of claim 14 comprising an actuator handle that is carried above the first telescopic blade assembly, coupled to the screw actuator for operation thereof, and pivotally mounted for movement between a stowed position hanging downwardly along the first telescopic blade assembly and a working position radiating outward therefrom.

16. An adjustable front fork system for a bicycle or tricycle comprising:

a steerer tube for coupling to handlebars of the bicycle or tricycle;

first and second telescopic blade assemblies residing on opposite sides of the steerer tube, each telescopic blade assembly comprising:

an outer blade unit having a hollow interior; and an inner blade unit telescopically mated with the outer blade unit for sliding movement of the inner blade member back and forth within the hollow interior the outer blade unit to retract and extend the inner blade unit relative to the outer blade unit through an open end thereof;

a connection of either the outer blade unit or the inner blade unit to the steerer tube at or adjacent an upper end of the blade assembly; and a wheel connector attached to the other one of either the outer blade unit or inner blade unit at a distance spaced downwardly from the connection toward a lower end of the blade assembly to support a respective end of a wheel axle of the bicycle or tricycle that is to be carried between the blade assemblies, whereby telescopic displacement of the inner blade members back and forth within the outer blade units changes a height of the adjustable fork measured between a top end of the steerer tube and the lower ends of the telescopic blade assemblies;

wherein the first telescopic blade assembly comprises a screw actuator operable to effect the telescopic displacement between the inner and outer blade units, an actuator handle is carried above the first telescopic blade assembly, and the threaded actuator comprises (a) a threaded rod mated with the internal threading of a surrounding tube of the first telescopic blade assembly to drive displacement of said tube along the threaded actuator under rotation thereof, and (b) an extension member reaching upwardly from the threaded rod to connect the actuator handle, the extension member being rotationally and telescopically coupled to the threaded rod, whereby the actuator handle is operable to drive rotation of the threaded rod via the extension member, and is displaceable upwardly and downwardly relative to the threaded member to ascend and descend with the surrounding tube.

\* \* \* \* \*